Nov. 1, 1949     R. G. PIETY     2,487,029
GEOPHONE

Filed March 7, 1945     3 Sheets-Sheet 1

INVENTOR
RAYMOND G. PIETY
BY
ATTORNEYS

Nov. 1, 1949 R. G. PIETY 2,487,029
GEOPHONE
Filed March 7, 1945 3 Sheets-Sheet 2
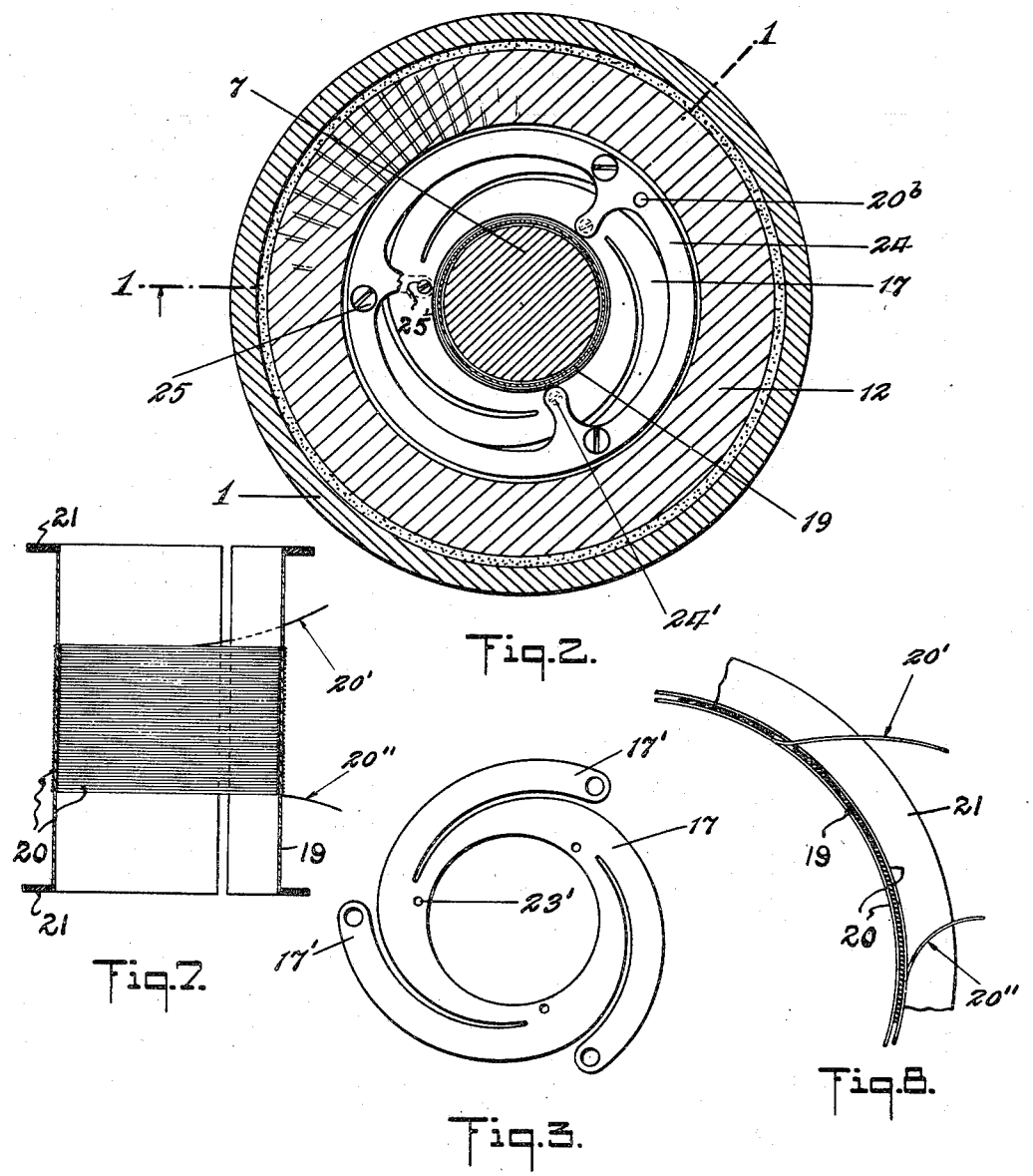
INVENTOR
RAYMOND G. PIETY
BY Darby &Darby
ATTORNEYS Nov. 1, 1949   R. G. PIETY   2,487,029
GEOPHONE
Filed March 7, 1945   3 Sheets-Sheet 3
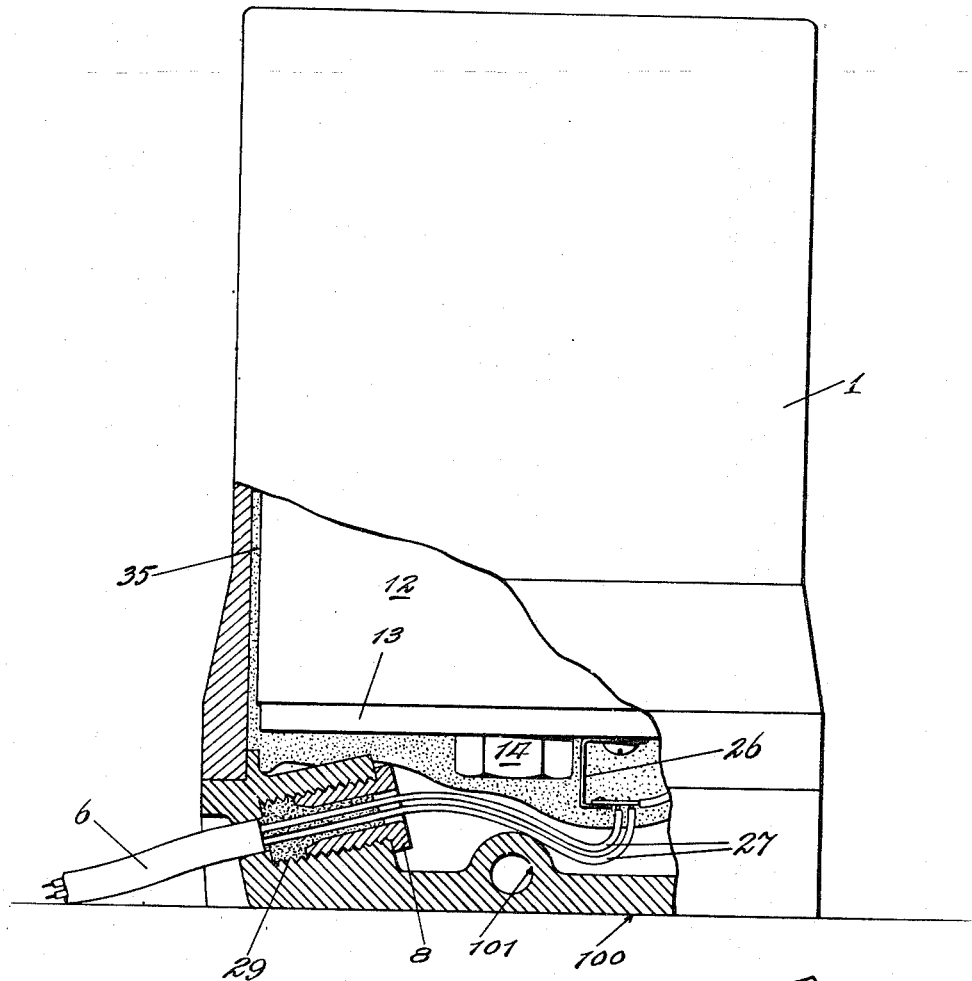
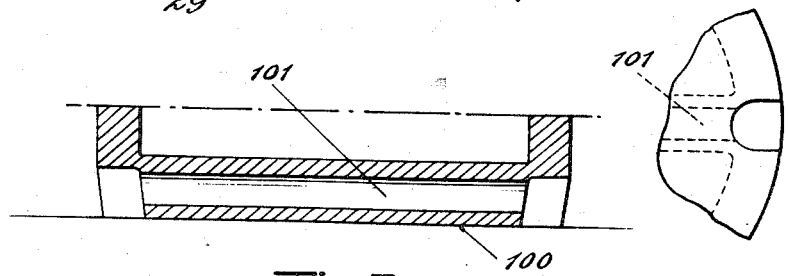
INVENTOR
RAYMOND G. PIETY
BY Darby & Darby
ATTORNEYS Patented Nov. 1, 1949

2,487,029

UNITED STATES PATENT OFFICE 2,487,029

GEOPHONE

Raymond G. Piety, Tuckahoe, N. Y., assignor to Phillips Petroleum Company, a corporation of Delaware Application March 7, 1945, Serial No. 581,472

4 Claims. (Cl. 177—352)

This invention relates to improvements in geophones as employed in seismographic exploration for the detection of such subsurface structures as are liable to contain mineral and oil deposits.

As those skilled in the art will appreciate, a geophone is an electromagnetic device sensitive to physical vibration usually placed upon or below the surface of the earth for the purpose of detecting and converting into electrical currents representative thereof, wave trains generated in and transmitted through the earth in geophysical exploration.

An object of this invention is to provide an improved form of geophone structure which is rugged, light in weight and easy to manipulate and plant on the earth surface or below it.

An important object of this invention is to provide a device of this type structurally devised and arranged so that it is equally efficient for converting vibrations into electrical currents in all positions, that is whether it lies on its side or stands on either end.

Another important object is to provide a structure of this kind which can safely withstand not only the normal shocks and stresses incident to its use, but abnormal shocks and stresses likely to be encountered in use, such as for example would result from inadvertently dropping a device onto a hard surface.

Another object is to provide a geophone which is entirely enclosed and is water- and moisture-proof.

A more specific object of the invention is to mount the current generating coil in a magnetic field in such a manner as to allow all the necessary freedom of movement in operative directions while constraining it against freedom of movement in all other directions.

Other and more detailed objects of the invention will be apparent from the following description of two embodiments of the invention as illustrated in the attached drawings and defined in the appended claims.

This invention resides substantially in the combination, construction, arrangement and relative location of parts, all as will be described in detail below.

In the accompanying drawings,

Figure 2 is a cross-sectional view taken on the line 2—2 of Figure 1;

Figure 3 is a plan view of one of the supporting springs for the current generating coil;

Figure 4 is an elevational view partly in cross-section of a modified structure;

Figure 5 is a central, cross-sectional view through the cover of the modification of Figure 4;

Figure 6 is a detailed plan view of one edge of the cover;

Figure 7 is a vertical, central, cross-sectional view through the generating coil structure and its supporting coil form; and Figure 8 is an enlarged horizontal, cross-sectional view through a portion of the structure of Figure 7 above the windings.

Figure 1:
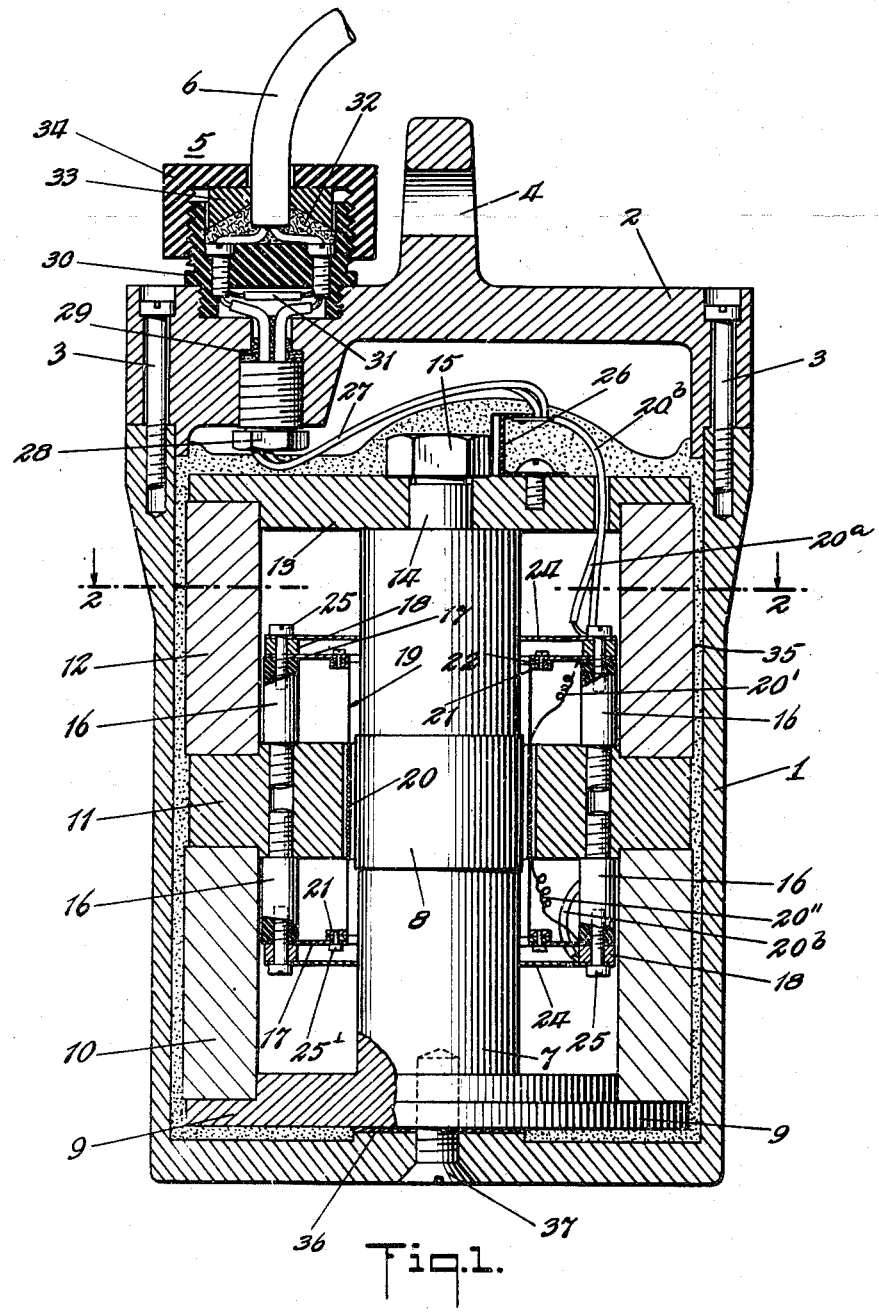
Figure 1 is a cross-sectional view taken on the line 1—1 of Figure 2.

In the illustrative embodiment of Figures 1 and 2 the housing 1, which is preferably of cast aluminum, is of circular cross-sectional form, closed at one end and open at the other end. The open end is closed by means of a cover 2, likewise preferably made of cast aluminum, which cover is removable and is attached in place to the main housing 1 by means of a series of screws 3. The cover and housing are preferably made in an overlapping relation such as would result from the annular rabbet on the cover, as illustrated in Figure 1, and these parts desirably have a ground or machined fit to assure a watertight seal at the mating surfaces. The cover is provided with an integral ring or loop 4 by means of which a handling rope or cable may be attached to the device.

The electromagnetic unit of the device includes a solid central cylindrical core 7 with an integral plate 9 of circular configuration at one end having an annular rabbet formed therein, as shown. At the longitudinal center of the core 7 is a raised cylindrical or enlarged portion 8 forming a central pole, and at the other end of the core is an integral threaded stud 14.

Seated on the annular flange of the end disc 9 is a permanent magnet 10 of cylindrical form, as is clear from Figure 1. Seated thereon is a ring like pole piece 11 having a central opening in which the portion 8 of the core is co-axially arranged. The annular pole piece 11 has annular rabbets on both sides adjacent the periphery to relatively position it on the ring magnet 10. A second ring shaped magnet 12 rests on the pole piece 11 and a disc 13, having an annular rabbet in turn rests on the free edge of the ring magnet 12 and against the end of the core 7. The disc 13 has a central hole in which the threaded stud 14 lies. A nut 15 cooperating therewith serves to lock all of these parts in assembled relation, which is that illustrated in Figure 1. The core 7 and integral disc 9, the annular pole piece 11, and the disc 13, are all of magnetizable material such as iron or steel.

Mounted on each side of the ring pole piece 11 are three posts 16 arranged in an angular relationship 120 degrees. The posts 16 are made of some suitable insulating material a number of which are available. For example, they may be molded of a plastic material, and are provided with threaded studs for mounting in threaded apertures in the ring pole piece 11, as illustrated in the drawings. Mounted on each side of the posts 16 is a flat spring 17 of the configuration clearly illustrated in Figure 3. This spring may be made of a number of suitable materials of which hardened beryllium copper spring stock is an example. In essence this spring is of spiral configuration and has three integral arms 17' with apertures in the ends by means of which they may be mounted on the posts 16 by screws 25. A spring bumper 24 of the form clearly shown in Figure 2 is also mounted on each side of the posts by means of the screws 25, in parallel relation with the associated spring 17 and spaced therefrom by means of collars or washers 18. As can be clearly ascertained from Figure 2, the spring bumper 24 is essentially a ring having three radially inwardly extending arms 24' positioned to overlie the springs 17 and limit their transverse movement under shocks and stresses.

The springs 17 have an enlarged circular opening through which the core 7 may extend and in alignment with which is a cylindrical support 19 for the current generating coil 20. The coil form or support 19 is preferably made of a sheet of mica and, as illustrated in Figure 7, is formed into a cylinder with the edges of the sheet circumferentially spaced a short distance to form a slot. Attached to the ends of this mica cylinder are a pair of rings 21 of any suitable material, such as for example a light metal such as Dow metal. The coil 20 is wound both on the inside and the outside of this coil form, as clearly shown in Figures 7 and 8. In one suitable construction it comprises 400 turns of No. 32 wire.

This structure can readily be formed by winding the turns for the entire portion of the coil on a mandrel and then forming the sheet of mica therearound and attaching it to the coil by means of orange shellac, or other suitable adhesive. The outer coil is then wound on the mica cylinder and similarly attached in place. The terminal ends of this coil are indicated at 20' and 20''. At this point it may also be noted that the Dow metal rings 21 are attached to the ends of the mica cylinder by means of orange shellac, and the adhesion between all these parts is further insured by heat treatment of the structure to polymerize the shellac. The particular materials recited are for the purpose of indicating preferable materials but those skilled in the electrical arts will understand that many other materials are suitable for these parts.

The structure of Figure 7 is mounted between the springs 17, as shown in Figure 1, and is secured thereto by means of screws 25' and washers 22. Thus the coil form 19 forms a rigid connection between the two springs 17. The screws 25' pass through suitable apertures 23' in the spring 17 (see Fig. 3), and screw into threaded openings in the Dow metal rings 21, as will be apparent to those skilled in the art.

An advantage of winding the coil in two parts and mounting it on the inner and outer faces of the cylinder 19 is that it greatly increases the clearance between the movable coil and the pole pieces in the assembled unit, and also favors the departure from a true cylinder caused by the longitudinal gap of about $\frac{1}{16}$" between the ends of the coiled mica sheet. As will be seen from Figure 1, the coil lies centrally of the annular air gap between the raised portion 8 and the central core 7 and the annular pole piece 11. As will be seen from Figure 1, the lead 20' extends to one of the screws 25 and the associated metal parts 17, 18 and 24, and a lead 20ª extends therefrom through an aperture in the disc 13 to the terminal bore 26. In a similar manner the lead 20' extends to the other end of the assembly from which the lead 20ᵇ extends to the terminal bore 26. The terminal bracket 26 comprises an insulating support attached to the disc 13 in any suitable manner, and provided with connection lugs, as those skilled in the art will readily appreciate. From these connection lugs extend a pair of insulated leads 27 which pass through a threaded bushing 28 mounted on the inside of the cover 2, and clamping or binding a suitable packing material 29 in the passage through which the leads issue to form a watertight joint.

A packing gland assembly 5 is mounted on the cover 2, comprising a cylindrical bushing 30 of some suitable insulating material having oppositely extending cylindrical, externally threaded extensions, one of which screws into a threaded recess in the top of the cap 2, as shown. In the transverse wall of the bushing are a pair of screws, to the inner ends of which are soldered or otherwise secured the ends of the leads 27. An insulated cable 6, containing a pair of conductors which are respectively soldered or otherwise attached to the same screws, extend to the other electrical equipment with which a device of this type is associated. The screws being tightly seated in the bushing prevent the entry of moisture into the device. At 31 is diagrammatically illustrated a damping resistor having its leads respectively soldered or otherwise attached to these screws and forming a shunt about the current coil 20. This resistor is a damping resistor and is proportioned to control the period of vibration of the coil assembly in accordance with the desired electrical characteristics of the device. In practice the value of this resistance may vary from 200 to 1000 ohms, depending upon the desired frequency characteristic of the device required. It will also be understood that in some cases this resistor may be shunted across the conductors in the cable 6 at some other point, as at the equipment to which it is connected, and in other cases no damping resistor at all may be required.

Attached to the other threaded end of the bushing 30 is an insulating cap 34 through which the conductor 6 passes, and by means of which a watertight seal, comprising a packing 32 and a packing gland 33 may be properly compressed to insure against entry of moisture into the device.

The magnetic unit within the housing is seated against the closed end thereof on a gasket 36 of suitable material, and is locked in place by means of a screw 37. A small annular space is provided around the unit which is filled with some suitable insulating material 35 which is preferably extended over the upper face of the disc 13 and the parts mounted thereon so as to completely enclose all of these parts, including the terminal bore, as shown in Figure 1. Thus the parts of the device most subject to deterioration by moisture are completely enclosed in a watertight shell of insulating material, which for example, may be some one of the readily available insulating compounds.

The structure of the figure thus far described is preferably employed in the position shown in Figure 1, that is the closed end of the housing is set on the ground or in a hole in the ground, although it may be used on its side or even set on its other end if the ground is properly prepared. However, its normal position is that shown in Figure 1, with the result that the conductor 6 will swing more or less free from the upper end, subjecting the operation of the instrument to undesired vibrations due to the action of the wind on the cable.

In order to avoid this possibility a suitably modified structure is illustrated in Figures 4, 5 and 6. Internally this structure is the same as that previously described. The main difference is in the construction of the cover 100, which in this case is flat across the end and is provided with a handling rope passage 101 extending through the body of the core through which a rope or cable may be threaded. Likewise, the insulating conductor 6 in this case passes through a modified form of sealing structure comprising the bushing 8 threaded into a substantially radially extending passage in the cover and cooperating with a packing material 29 through which the conductor passes to form a fluidtight seal. In this case the conductor 6 extends from the instrument to the equipment connected thereto along the ground and is not subject to disturbances due to vibration by the wind. Of course, when desired, the device can be turned over and stood on its other end, or laid on its side on the ground.

From the foregoing description it will be seen that the operative part of the instrument is extremely symmetrical so that from a use standpoint it works equally well in all positions.

An important feature of the structure is in the spring suspension comprising the springs 17 which permits the desired freedom of movement axially of the core while affording complete restraint against movement at least of the spring mounting in a radial direction. While a spring of this type does not follow Hook's law for any appreciable displacement, for all practical purposes these springs do follow that law as the normal displacements thereof in use are of the order of a few thousandths of an inch at the most. Thus the response of the instrument is substantially linear. There likewise is little difference in its operation when standing on either end as against lying on its side, in that in the former case in one practical form of the instrument its period of vibration is 15 cycles, while lying on its side it is 21 cycles. The three point suspension form of the spring permits of the necessary firmness in mounting the spring without constraining its response to external vibrations in the desired direction. The spring itself is mounted at three points and the coil form is attached thereto at three points, placing a minimum amount of constraint on the springs. The construction is such as to adapt the instrument to quantity production while attaining the desired uniformity of characteristics.

Another advantage of this construction is that it eliminates the use of oil for dampening the movement of the coil, an expedient commonly used. As a result compensation for temperature changes is not required.

By way of comparison, a commonly used prior art device of this kind weighs 14 pounds, whereas this device weighs but about 6½ pounds, which represents a considerable saving in weight in use since a single exploration party may commonly use as many as 12 of these instruments. The construction illustrated, and particularly that of Figure 4, has the advantage that the device may often be used on the surface of the earth by reason of the reduction of the effect of exposure thereof to wind.

There are a number of other advantages of the structure of which the following may be mentioned. The device is relatively inexpensive in relation to the cost of competitive devices, is highly rugged in construction, and hence maintenance and repair costs are much lower.

Those skilled in the art will readily appreciate that many of the details of the structure herein disclosed are capable of considerable variation by those skilled in the art without departure from the novel subject matter and structural combinations herein disclosed, and I do not, therefore, desire to be strictly limited to the illustrative examples of this disclosure, but only as required by the appended claims.

What is claimed is:

1. In a geophone having a case, permanent magnets forming a magnetic field which field follows the vibratory movements of the ground mounted in said case, said field being formed with an air gap, and an inertia member suspended therein comprising a coil in which the movement of the magnetic field in response to earth movements generates current, the improvement comprising a lightweight mounting for said coil comprising a longitudinally slotted mica cylinder with one helical layer of said coil cemented to the inside of said cylinder and a second helical layer of said helical coil cemented to the outside of said cylinder, and springs mounting said cylinder at the top and bottom to said field structure.

2. In a geophone having a case, permanent magnets forming a magnetic field structure which field follows the vibratory movements of the ground mounted in said case, said field being formed with an air gap, and an inertia member suspended therein comprising a coil in which the movement of the magnetic field in response to earth movements generates current, the improvement comprising a lightweight mounting for said coil comprising a longitudinally slotted mica cylinder with one helical layer of said coil cemented to the inside of said cylinder and a second helical layer of said helical coil cemented to the outside of said cylinder, and flat supporting springs having spiral arms mounting said cylinder at the top and bottom to said field structure.

3. In a vibration actuated electro-mechanical device, the combination comprising a unitary structure composed of a magnetizable core having a radially extending annular pole piece, a pair of magnetizable plates on the ends of said core, a magnetizable disc forming a pole piece surrounding said annular pole piece to provide an annular air gap, a pair of annular magnets respectively disposed between said plates and disc, a cylindrical sleeve concentric with said core, a winding on said sleeve lying in said air gap, a pair of flat springs attached to the ends of said sleeve, and means on opposite sides of said disc for supporting said flat springs, said plates, magnets and disc forming a closed housing for said sleeve, winding and springs, said flat springs comprising a central annular portion having a plurality of arcuate cantilever arms and said supporting means comprising posts to which the ends of said arms are secured.

4. In the combination of claim 3, bumper springs supported adjacent said flat springs and by said flat spring supporting means to limit movement of said sleeve in either direction axially of said core.

RAYMOND G. PIETY.

REFERENCES CITED

The following references are of record in the file of this patent:

UNITED STATES PATENTS

| Number | Name | Date |
|---|---|---|
| 520,810 | Thomson | June 5, 1894 |
| 2,130,213 | Wolf | Sept. 13, 1938 |
| 2,269,678 | Maurer | Jan. 13, 1942 |
| 2,271,864 | Honnell | Feb. 3, 1942 |
| 2,307,792 | Hoover | Jan. 12, 1943 |
| 2,311,079 | Parr | Feb. 16, 1943 |
| 2,316,616 | Powell | Apr. 13, 1943 |
| 2,348,225 | Petty | May 9, 1944 |